US012542359B2

(12) United States Patent
Yang et al.

(10) Patent No.: US 12,542,359 B2
(45) Date of Patent: Feb. 3, 2026

(54) ANTENNA MODULE AND ELECTRONIC DEVICE INCLUDING THE SAME

(71) Applicant: Samsung Electronics Co., Ltd., Suwon-si (KR)

(72) Inventors: Doo Hyun Yang, Suwon-si (KR); Doo Seok Choi, Suwon-si (KR); Sang Hyun Baek, Suwon-si (KR); Young Ki Lee, Suwon-si (KR); Joon Hoi Hur, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 175 days.

(21) Appl. No.: 18/351,200

(22) Filed: Jul. 12, 2023

(65) Prior Publication Data

US 2024/0021996 A1 Jan. 18, 2024

(30) Foreign Application Priority Data

Jul. 18, 2022 (KR) ........................ 10-2022-0088030

(51) Int. Cl.
*H01Q 9/04* (2006.01)
*H01Q 1/22* (2006.01)

(52) U.S. Cl.
CPC ......... *H01Q 9/0414* (2013.01); *H01Q 1/2283* (2013.01); *H01Q 9/045* (2013.01)

(58) Field of Classification Search
CPC .... H01Q 9/0414; H01Q 1/2283; H01Q 9/045; H01Q 21/06; H01Q 9/0457
See application file for complete search history.

(56) References Cited

U.S. PATENT DOCUMENTS 7,109,926 B2 9/2006 du Toit
7,999,744 B2 8/2011 Chin et al.
(Continued)

FOREIGN PATENT DOCUMENTS

CN 105226390 A 1/2016
KR 20110068133 A 6/2011
(Continued)

OTHER PUBLICATIONS

K.M.Luk,et al. "Broadband microstrip patch antenna", Electronics Letters Jul. 23, 1998 vol. 34 No. 15.
(Continued)

*Primary Examiner* — Renan Luque
(74) *Attorney, Agent, or Firm* — Harness, Dickey & Pierce, P.L.C.

(57) ABSTRACT

Provided is an antenna module including a first antenna patch for radiating electromagnetic energy of a first frequency band, a second antenna patch for radiating electromagnetic energy of a second frequency band different from the first frequency band, and both the first antenna patch and the second antenna patch spaced apart from a ground structure in a first direction, and a feed structure spaced apart from each of the first antenna patch and the second antenna patch, the feed structure being between the first antenna patch and the second antenna patch, the feed structure being connected to the ground structure, and the feed structure being configured to provide an RF signal to the first antenna patch and second antenna patch, and the feed structure including a horizontal feed line extending in a second direction intersecting the first direction, and a vertical feed line extending in the first direction.

20 Claims, 14 Drawing Sheets

(56) References Cited

U.S. PATENT DOCUMENTS

| | | | | |
|---|---|---|---|---|
| 8,854,265 | B1 | 10/2014 | Yang et al. | |
| 10,693,235 | B2 | 6/2020 | Chen | |
| 2020/0136269 | A1 * | 4/2020 | Choi | H01Q 9/0435 |
| 2020/0243975 | A1 * | 7/2020 | Chen | H01Q 9/045 |

FOREIGN PATENT DOCUMENTS

| | | | |
|---|---|---|---|
| KR | 101163419 | B1 | 7/2012 |
| KR | 101166089 | B1 | 7/2012 |
| KR | 20200046482 | A | 5/2020 |
| KR | 20200141339 | A | 12/2020 |
| WO | WO-22019351 | A1 | 1/2022 |

OTHER PUBLICATIONS

David. M. Pozar, “Microstrip Antennas”, Proceedings of the IEEE, vol. 80, No. 1, Jan. 1992.

K.F.Lee, et al., “Studies of stacked electromagnetically coupled patch antenna”, Microwave and Optical Technology Leiters / vol. 8, No. 4, Mar. 1995.

* cited by examiner

ANTENNA MODULE AND ELECTRONIC DEVICE INCLUDING THE SAME

CROSS-REFERENCE TO RELATED APPLICATION

This application claims priority from Korean Patent Application No. 10-2022-0088030 filed on Jul. 18, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to an antenna module and an electronic device including the same.

2. Description of the Related Art

A higher frequency band may be used to increase the throughput of wireless communication. For example, a wireless communication system such as 5G (5th Generation) prescribes the use of a millimeter wave (mmWave) frequency band. Accordingly, an antenna for wireless communication providing a wide frequency bandwidth is used. In addition, an antenna array including a plurality of antennas is used for beamforming.

Portable wireless communication equipment, such as a mobile phone, has limited mounting space for an antenna. Accordingly, the limited mounting space increases the difficulty in providing an antenna capable of covering a wider frequency band.

SUMMARY

Aspects of the present disclosure provide an antenna module capable of covering a wider frequency band in a limited space.

Aspects of the present disclosure also provide an electronic device capable of covering a wider frequency band in a limited space.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided an antenna module including a first antenna patch for radiating electromagnetic energy of a first frequency band, a second antenna patch for radiating electromagnetic energy of a second frequency band, the second frequency band being different from the first frequency band, and both the first antenna patch and the second antenna patch spaced apart from a ground structure in a first direction, and a feed structure spaced apart from each of the first antenna patch and the second antenna patch, the feed structure being between the first antenna patch and the second antenna patch, the feed structure being connected to the ground structure, and the feed structure being configured to provide an RF signal to the first antenna patch and second antenna patch, and the feed structure including a horizontal feed line extending in a second direction intersecting the first direction, and a vertical feed line extending in the first direction.

According to an aspect of the present disclosure, there is provided an electronic device including a radio frequency integrated circuit (RFIC) chip, and a first antenna module on the RFIC chip, the first antenna module including a first dielectric substrate, a second dielectric substrate, a third dielectric substrate, the first dielectric substrate, the second dielectric substrate and the third dielectric substrate being sequentially stacked on a ground structure in a first direction, a first antenna patch on the first dielectric substrate, a second antenna patch on the third dielectric substrate, the first antenna patch and the second antenna patch not being connected to the ground structure, and a first feed structure spaced apart from each of the first antenna patch and the second antenna patch in the first direction, the first feed structure electrically connecting the RFIC chip and the first antenna module, and the first feed structure including a conductive pad extending in a second direction, the second direction intersecting the first direction, a conductive via penetrating through the first dielectric substrate, and a feed portion connected to the ground structure.

According to an aspect of the present disclosure, there is provided an electronic device including a radio frequency integrated circuit (RFIC) chip, a first antenna module electrically connected to the RFIC chip through a first feed structure, a second antenna module spaced apart from the first antenna module in a first direction, the second antenna module being electrically connected to the RFIC chip through a second feed structure, and a third antenna module spaced apart from each of the first antenna module and the second antenna module in the first direction, the third antenna module being electrically connected to the RFIC chip through a third feed structure, the first antenna module including a first antenna patch for radiating electromagnetic energy of a first frequency band, a second antenna patch for radiating electromagnetic energy of a second frequency band, the second frequency band being different from the first frequency band, both the first antenna patch and the second antenna patch being spaced apart from a ground structure in a second direction, and the second direction being perpendicular to the first direction, and a feed structure spaced apart from each of the first antenna patch and the second antenna patch, the feed structure being between the first antenna patch and second antenna patch, the feed structure being connected to the ground structure, the feed structure being configured to provide an RF signal to the first antenna patch and the second antenna patch, and the first feed structure including a horizontal feed line, and a vertical feed line.

The details of some exemplary embodiments are included in the detailed description and drawings.

BRIEF DESCRIPTION OF THE DRAWINGS

The above and other aspects and features of the present disclosure will become more apparent by describing in detail some exemplary embodiments thereof with reference to the attached drawings, in which.

DETAILED DESCRIPTION

Hereinafter, some exemplary embodiments of the present disclosure will be described with reference to the attached drawings.

Figure 1:
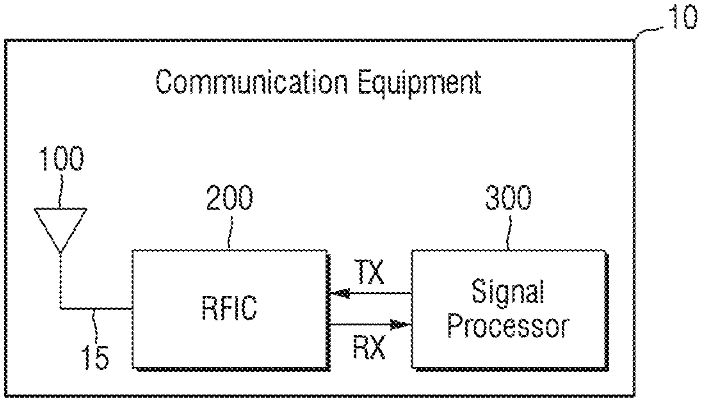
FIG. 1 is a diagram for describing a communication equipment according to some exemplary embodiments.

FIG. 1 is a diagram for describing a communication equipment according to some exemplary embodiments.

As illustrated in FIG. 1, a communication equipment 10 may include an antenna 100, may communicate with a counterpart communication equipment in a wireless communication system by transmitting or receiving a signal through the antenna 100, and may be referred to as a wireless communication equipment.

A wireless communication system in which the communication equipment 10 communicates with the counterpart communication equipment may be, by way of non-limiting example, a wireless communication system using a cellular network such as a 5th generation wireless (5G) system, a long term evolution (LTE) system, an LTE-advanced system, a code division multiple access (CDMA) system, a global system for mobile communications (GSM) system, or the like, and may be a wireless local area network (WLAN) system or any other wireless communication system. Hereinafter, the wireless communication system may be mainly described with reference to a wireless communication system using the cellular network. However, the technical spirit of the present disclosure is not limited thereto.

As illustrated in FIG. 1, the communication equipment 10 may include an antenna 100, a radio frequency integrated circuit (RFIC) 200, and/or a signal processor 300, and the antenna 100 and the RFIC 200 may be connected through a feed line 15. In some exemplary embodiments, the antenna 100 may also be referred to as an antenna module, and/or the antenna 100 and the feed line 15 may also be collectively referred to as an antenna module. In addition, the antenna 100, the feed line 15, and the RFIC 200 may be collectively referred to as an RF system or an RF device.

The RFIC 200 may provide a signal generated by processing a transmission signal TX provided from the signal processor 300 to the antenna 100 through the feed line 15 in a transmission mode, and may provide a reception signal RX to the signal processor 300 by processing a signal received from the antenna 100 through the feed line 15 in a reception mode. For example, the RFIC 200 may include a transmitter, and the transmitter may include a filter, a mixer, and/or a power amplifier (PA). In addition, the RFIC 200 may include a receiver, and the receiver may include a filter, a mixer, and/or a low noise amplifier (LNA). In some exemplary embodiments, the RFIC may also include a plurality of transmitters and/or receivers, and/or may also include a transceiver in which the transmitter and receiver are coupled.

The signal processor 300 may generate the transmission signal TX by processing a signal including information to be transmitted, and may generate a signal including information by processing the reception signal RX. For example, the signal processor 300 may include an encoder, a modulator, and/or a digital-to-analog converter (DAC) to generate the transmission signal TX. In addition, the signal processor 300 may include an analog-to-digital converter (ADC), a demodulator, and/or a decoder to process the reception signal RX. The signal processor 300 may also generate a control signal for controlling the RFIC 200, and may set a transmission mode or a reception mode, and/or may adjust power and/or gain of components included in the RFIC 200, through the control signal. In some exemplary embodiments, the signal processor 300 may include one or more cores and a memory that stores instructions executed by the cores, and at least a portion of the signal processor 300 may include a software block stored in the memory. In some exemplary embodiments, the signal processor 300 may include a logic circuit designed through logic synthesis, and at least a portion of the signal processor 300 may include a hardware block implemented with the logic circuit.

The wireless communication system may prescribe a higher spectrum band for a higher data throughput. For example, a 5G cellular system (or 5G wireless system) may prescribe millimeter waves (mmWave) of 24 GHz or more. The millimeter wave (mmWave) enables wideband transmission, enables miniaturization of the RF system, e.g., the antenna 100 and the RFIC 200, and may provide improved directivity, but since attenuation is prone to occur in the millimeter wave (mmWave), higher transmit power may be used to mitigate such attenuation.

According to the Friis transmission formula, the transmission power may be calculated as a product of an output power of the power amplifier and a gain of the antenna 100. Due to the lower power efficiency of the power amplifier included in the RFIC 200, increasing the power by the power amplifier may cause heat generation, power consumption, and the like, and thus, the transmission power may instead be increased by acquiring a higher antenna gain. The antenna gain may be proportional to a size of an effective aperture area, but in the case of applications that involve space efficiency, such as mobile phones, the effective opening area may also be limited, and a challenge in which a communication coverage is reduced may occur because a beam width output from the antenna 100 becomes narrower as the antenna gain increases.

Figure 2:
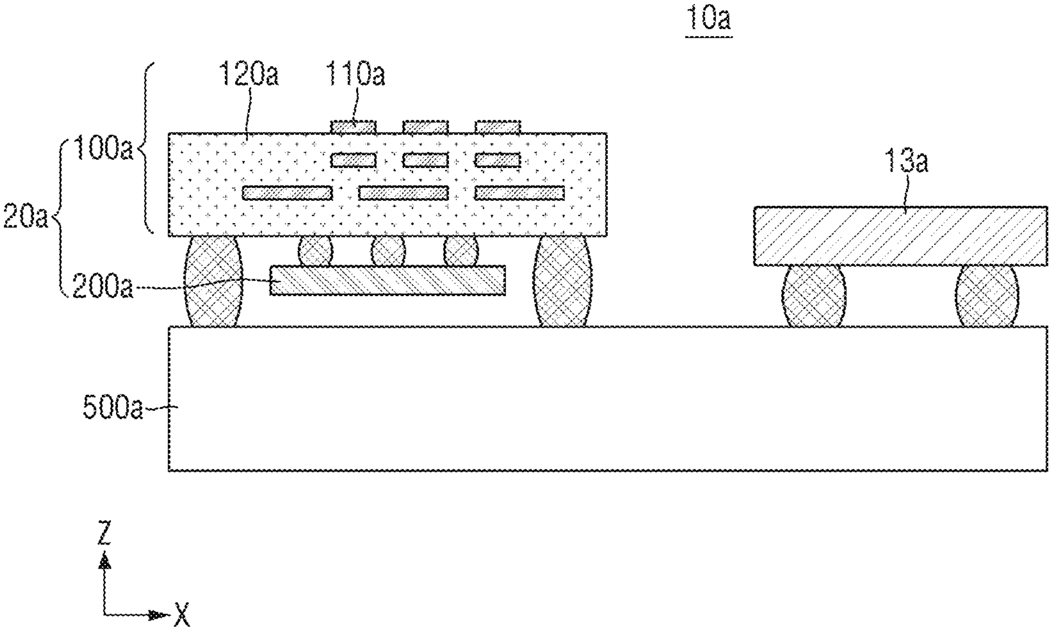
FIG. 2 is a view schematically illustrating components of a communication equipment according to some exemplary embodiments.

FIG. 2 illustrates examples of a layout of components of the communication equipment 10 of FIG. 1 according to some exemplary embodiments. Hereinafter, FIG. 2 will be described with reference to FIG. 1, and overlapping content in the description of FIG. 2 may be omitted. In some exemplary embodiments, an X-axis direction and a Y-axis direction that are orthogonal to each other may be referred to as a first horizontal direction and a second horizontal direction, respectively, and a plane formed by an X-axis and a Y-axis may be referred to as a horizontal plane. In addition, the area may refer to an area in a surface parallel to the horizontal plane, and a direction perpendicular to the horizontal plane, that is, a Z-axis direction may be referred to as a vertical direction. A component disposed in a +Z-axis direction relative to other components may be referred to as being above other components, and a component disposed in a −Z-axis direction relative to other components may be referred to as being below other components. In addition, among the surfaces of the component, a surface in the +Z-axis direction may be referred to as an upper surface of the component, and a surface in the −Z-axis direction may be referred to as a lower surface of the component.

Since most loss parameters may deteriorate in a higher frequency band such as a millimeter wave (mmWave) frequency band, it may not be easy to adopt layouts of the antenna 100 and the RFIC 200 used in a lower frequency band, for example, a band less than 6 GHz as they are. For example, an antenna feed structure used in the lower frequency band may significantly reduce attenuation characteristics of the signal in the millimeter wave (mmWave) frequency band, and may generally deteriorate effective isotropic radiated power (EIRP) and noise figure. Accordingly, in order to minimize (or reduce) signal attenuation by the feed line 15 of FIG. 1, the antenna 100 and the RFIC 200 may be disposed adjacent to each other. In particular, in mobile applications such as mobile phones, higher space efficiency may be used, and accordingly, as illustrated in FIG. 2, a system-in-package (SiP) structure in which the antenna 100 is disposed on the RFIC 200 may be adopted.

Referring to FIG. 2, a communication equipment 10*a* may include an electronic device 20*a*, a digital integrated circuit 13*a*, and/or a carrier board 500*a*, and the electronic device 20*a* and the digital integrated circuit 13*a* may be mounted on an upper surface of the carrier board 500*a*. The electronic device 20*a* and the digital integrated circuit 13*a* may be communicatively connected to each other through conductive patterns formed on the carrier board 500*a*. According to some exemplary embodiments, the carrier board 500*a* may be a printed circuit board (PCB). The digital integrated circuit 13*a* may include the signal processor 300 of FIG. 1, and thus may transmit the transmission signal TX to an RFIC 200*a* (also referred to herein as the RFIC chip 200*a*) or receive the reception signal RX from the RFIC 200*a*, and/or provide a control signal for controlling the RFIC 200*a*. According to some exemplary embodiments, the digital integrated circuit 13*a* may include one or more cores and/or memories, and may control an operation of the communication equipment 10*a*.

The electronic device 20*a* may include an antenna module 100*a* and/or the RFIC chip 200*a*. As illustrated in FIG. 2, the antenna module 100*a* may include a dielectric substrate 120*a* and a conductor 110*a* formed on the dielectric substrate 120*a*. For example, the antenna module 100*a* may include a ground plane parallel to a horizontal plane and an antenna patch, and may also include a feed line for supplying a signal from the RFIC chip 200*a* to the antenna patch. The RFIC chip 200*a* may have an upper surface electrically connected to a lower surface of the antenna module 100*a*. Meanwhile, although not specifically illustrated, the RFIC chip 200*a* and the digital integrated circuit 13*a* may also be mounted on a lower surface of the carrier board 500*a*.

Figure 3:
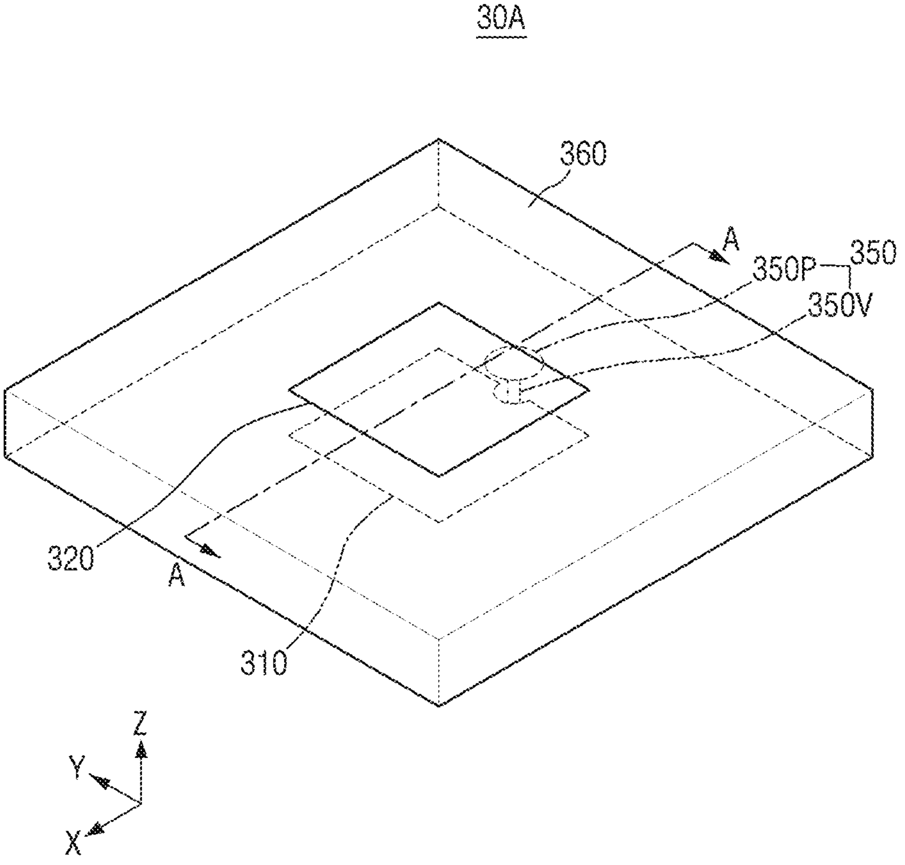
FIG. 3 is a perspective view schematically illustrating an antenna module according to some exemplary embodiments.
Figure 4:
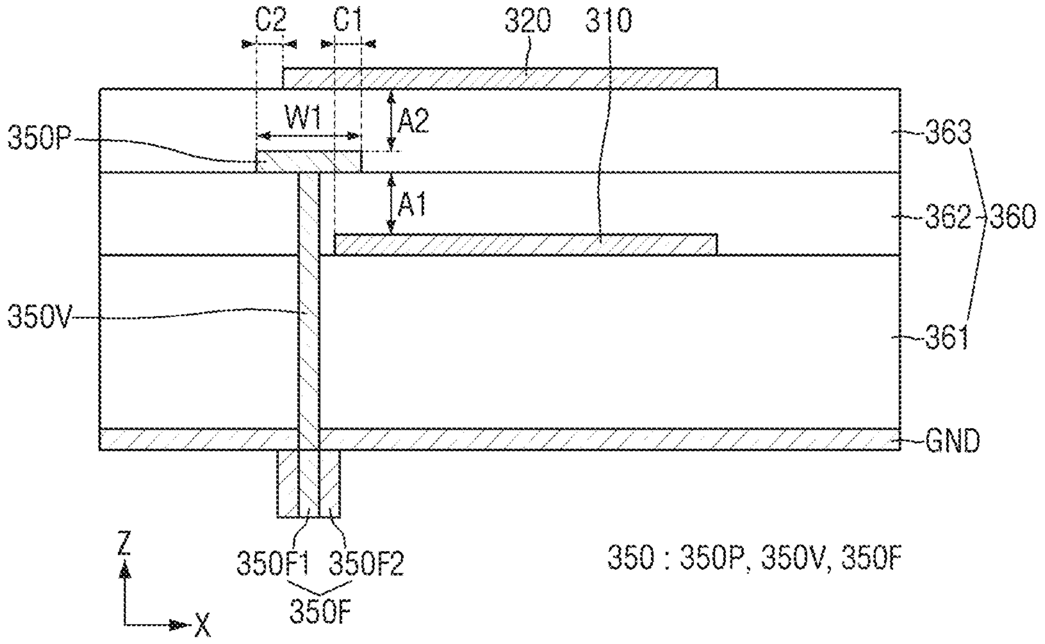
FIG. 4 is a cross-sectional view taken along the line A-A of FIG. 3.
Figure 5:
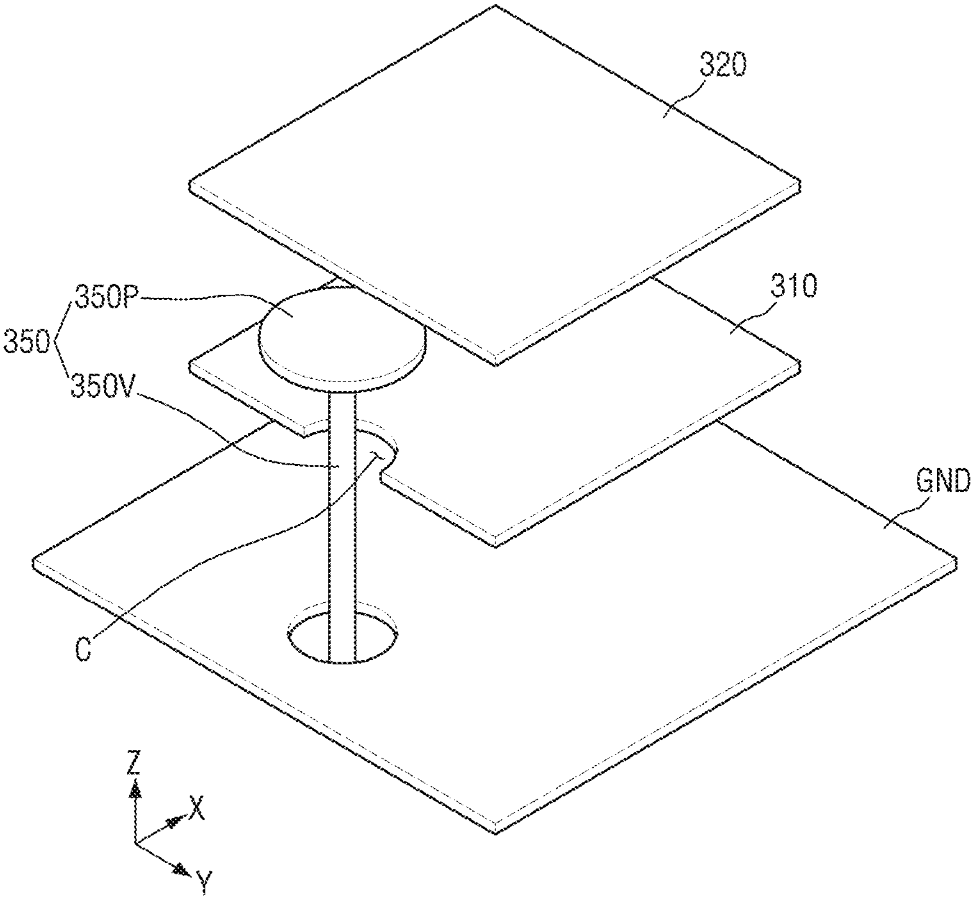
FIG. 5 is a view schematically illustrating the antenna module of FIG. 3.

FIG. 3 is a perspective view schematically illustrating an antenna module according to some exemplary embodiments. FIG. 4 is a cross-sectional view taken along the line A-A of FIG. 3. FIG. 5 is a view schematically illustrating the antenna module of FIG. 3.

The electronic device 20*a* may include an RFIC chip 200*a*, a first antenna module 30A, a second antenna module 30B, a third antenna module 30C, a fourth antenna module 30D, and/or a fifth antenna module 30E. Each of the antenna modules 30A, 30B, 30C, 30D, and 30E described below may mean an antenna element including an antenna patch, respectively. In addition, an antenna array 1000 including each antenna element, which will be described later in connection with FIG. 11, may refer to an array of an antenna module connected to the RFIC chip 200*a*.

Referring to FIGS. 3 and 4, the first antenna module 30A may include first and second antenna patches 310 and 320, a feed structure 350 (also referred to herein as a first feed structure 350), and/or a plurality of dielectric substrates 360.

In some exemplary embodiments, a first direction Z may refer to a direction perpendicular to each of the upper surfaces of the plurality of dielectric substrates 360, and a second direction X and a third direction Y may refer to directions that are parallel to each of the upper surfaces of the plurality of dielectric substrates 360 and intersect (e.g., perpendicularly intersect) each other.

The plurality of dielectric substrates 360 may be sequentially stacked on a ground structure GND in the first direction Z. For example, the plurality of dielectric substrates 360 may include a first dielectric layer 361, a second dielectric layer 362, and/or a third dielectric layer 363 sequentially stacked from the ground structure GND. Although it is illustrated in FIG. 5 that the number of dielectric layers is three, the technical spirit of the present disclosure is not limited thereto. That is, the number of dielectric layers may be greater or smaller than three.

The first antenna patch 310 may be disposed on the first dielectric layer 361, and the second antenna patch 320 may be disposed on the third dielectric layer 363. A horizontal feed line 350P of a first feed structure 350 to be described later may be disposed on the second dielectric layer 362. The first and second antenna patches 310 and 320 may have a quadrangular shape. However, the technical spirit of the present disclosure is not limited thereto, and the first and second antenna patches 310 and 320 may also have, for example, a circular shape or a rhombus shape.

For example, each of the plurality of dielectric substrates 360 may include a dielectric material. Each of the plurality of dielectric substrates 360 may be provided as a printed circuit board having a copper foil attached onto at least one surface thereof. In this case, a thickness of each of the dielectric substrates or a separation distance along the first direction Z between the plurality of antenna patches is not limited to that illustrated, and may be formed in various structures according to a stacked form of the printed circuit board.

Each of the first and second antenna patches 310 and 320 may be disposed to be spaced apart from the ground structure GND in the first direction Z. Each of the first and second antenna patches 310 and 320 may not be connected to the ground structure GND.

Based on the first direction Z, the second antenna patch 320 may be disposed above the first antenna patch 310. For example, the first antenna patch 310 may be a main radiator, and the second antenna patch 320 may be a parasitic patch. However, the technical spirit of the present disclosure is not limited thereto.

Areas of the first and second antenna patches 310 and 320 may be substantially the same as, or the same as, each other. However, the technical spirit of the present disclosure is not limited thereto, and the areas of the first and second antenna patches 310 and 320 may be different from each other. In some exemplary embodiments, the first and second antenna patches 310 and 320 may overlap each other in at least a partial region.

Based on the second direction X, a horizontal feed line 350P to be described later may have one end and the other end opposing each other, and may have a first width W1 that is a distance from the one end to the other end. Based on the second direction X, the other end of the horizontal feed line 350P may be spaced apart from one end of the first antenna patch 310 by a first distance C1. Based on the second direction X, one end of the horizontal feed line 350P may be spaced apart from one end of the second antenna patch 320 by a second distance C2.

The horizontal feed line 350P may at least partially overlap the first and second antenna patches 310 and 320. Referring to FIG. 5, the horizontal feed line 350P may overlap the first antenna patch 310 in the first direction Z by the first distance C1. The horizontal feed line 350P may overlap the second antenna patch 320 in the first direction Z by a difference W1−C2 between the first width and the second distance.

Based on the first direction Z, a first distance A1 between the first antenna patch 310 and the horizontal feed line 350P and a second distance A2 between the second antenna patch 320 and the horizontal feed line 350P may be the same as each other, or may be substantially the same as each other.

However, the width of the horizontal feed line 350P, and the width or length of the area where the horizontal feed line 350P and each of the first and second antenna patches 310 and 320 overlap each other, are not limited to those illustrated in the drawing (and discussed above) and may be variously formed. In addition, a separation distance along the first direction Z between the horizontal feed line 350P and the first antenna patch 310, and a separation distance along the first direction Z between the horizontal feed line 350P and the second antenna patch 320, are also not limited to those illustrated in the drawings (and discussed above) and may be variously formed.

Referring to FIG. 5, the first antenna patch 310 may include a concave portion C recessed into an inner side based on a direction parallel to the second direction X. The concave portion C may surround at least a portion of a vertical feed line 350V to be described later.

The first antenna patch 310 may transmit and/or receive a first RF signal of a first frequency band, and the second antenna patch 320 may transmit and/or receive a second RF signal of a second frequency band different from the first frequency band. For example, the first frequency band may be a higher frequency band than the second frequency band, but the technical spirit of the present disclosure is not limited thereto.

The first feed structure 350 may electrically connect the RFIC chip 200*a* and the first antenna module 30A to each other. The first feed structure 350 may provide the first and second RF signals to the first and second antenna patches 310 and 320 by coupling feeding, respectively. The first antenna patch 310 may be excited by the first RF signal provided from the first feed structure 350 to radiate electromagnetic energy of the first frequency band. The second antenna patch 320 may be excited by the second RF signal provided from the first feed structure 350 to radiate electromagnetic energy of the second frequency band.

The first feed structure 350 may be disposed to be spaced apart from each of the first and second antenna patches 310 and 320 between the first and second antenna patches 310 and 320 based on the first direction Z. The first feed structure 350 may not be in contact with each of the first and second antenna patches 310 and 320. That is, the first and second antenna patches 310 and 320 may radiate signals by an indirect feeding method rather than a direct feeding method.

The first feed structure 350 may include a horizontal feed line 350P, a vertical feed line 350V, and/or a feed portion 350F.

The horizontal feed line 350P may be disposed on the second dielectric layer 362 between the first and second antenna patches 310 and 320. The horizontal feed line 350P may extend in the second direction X intersecting the first direction Z. The horizontal feed line 350P may be formed in the form of a disk-shaped conductive pad. The horizontal feed line 350P may be disposed to be spaced apart from each of the first and second antenna patches 310 and 320 in the first direction Z without being in contact with each of the first and second antenna patches 310 and 320.

The vertical feed line 350V may extend in the first direction Z to penetrate through the lowermost first dielectric layer 361 among the plurality of dielectric substrates 360. The vertical feed line 350V may not be in contact with the first and second antenna patches 310 and 320.

The vertical feed line 350V may be disposed to be spaced apart from the ground structure GND. Alternatively, although not specifically illustrated, an insulating material may be interposed between the vertical feed line 350V and the ground structure GND.

The vertical feed line 350V may be formed in the form of a conductive via. Although not specifically illustrated, the vertical feed line 350V may include a first conductive layer and a second conductive layer filling the inside of the first conductive layer. For example, the first conductive layer may be a seed layer, and the second conductive layer may be a conductive layer formed through electroplating. However, the technical spirit of the present disclosure is not limited thereto.

The feed portion 350F may be disposed below the ground structure GND. For example, the feed portion 350F may be provided in the form of a coaxial cable.

The feed portion 350F may include a first conductive layer 350F1 and/or a second conductive layer 350F2 disposed on the first conductive layer 350F1. The first conductive layer 350F1 may be in contact with the vertical feed line 350V of the inner side, and the second conductive layer 350F2 may be in contact with the ground structure GND of the outer side. Accordingly, the feed structure 350 may be connected to the ground structure GND.

Each of the horizontal feed line 350P, the vertical feed line 350V, and the feed portion 350F may include a conductive material. For example, the conductive material may include copper (Cu). However, the technical spirit of the present disclosure is not limited thereto.

Figure 6:
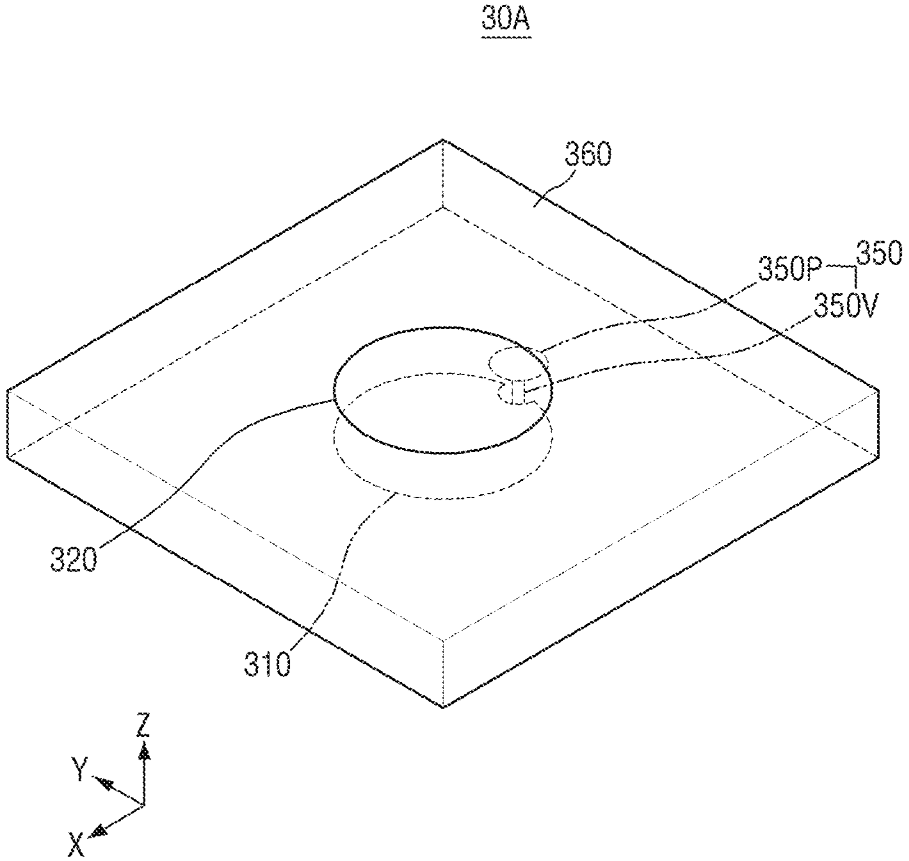
FIG. 6 is a perspective view schematically illustrating an antenna module according to some exemplary embodiments.

FIG. 6 is a perspective view schematically illustrating an antenna module according to some exemplary embodiments. For convenience of explanation, differences from the contents described above with reference to FIGS. 1 to 5 will be mainly described.

Referring to FIG. 6, each of the first and second antenna patches 310 and 320 may be formed in a circular shape.

FIGS. 7 to 10 are cross-section views schematically illustrating the antenna module according to some exemplary embodiments. For convenience of explanation, differences from the contents described above with reference to FIGS. 1 to 6 will be mainly described.

Figure 7:
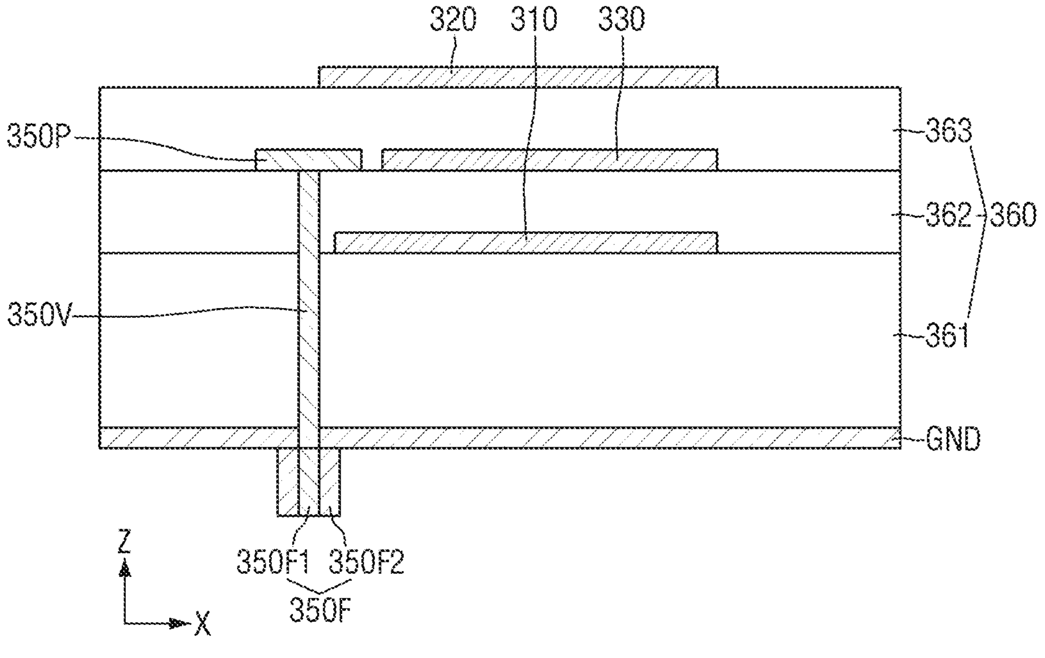
FIGS. 7 to 10 are cross-section views schematically illustrating the antenna module according to some exemplary embodiments.

Referring to FIG. 7, the first antenna module 30A may further include a third antenna patch 330 disposed between the first antenna patch 310 and the second antenna patch 320. The third antenna patch 330 may be disposed on the second dielectric layer 362. The first to third antenna patches 310, 320, and 330 may be coupled and fed by the first feed structure 350.

The horizontal feed line 350P may be disposed on the same plane as, or a similar plane to, the third antenna patch 330. However, the technical spirit of the present disclosure is not limited thereto, and the horizontal feed line 350P may not be disposed on the same plane as the third antenna patch 330.

Figure 8:
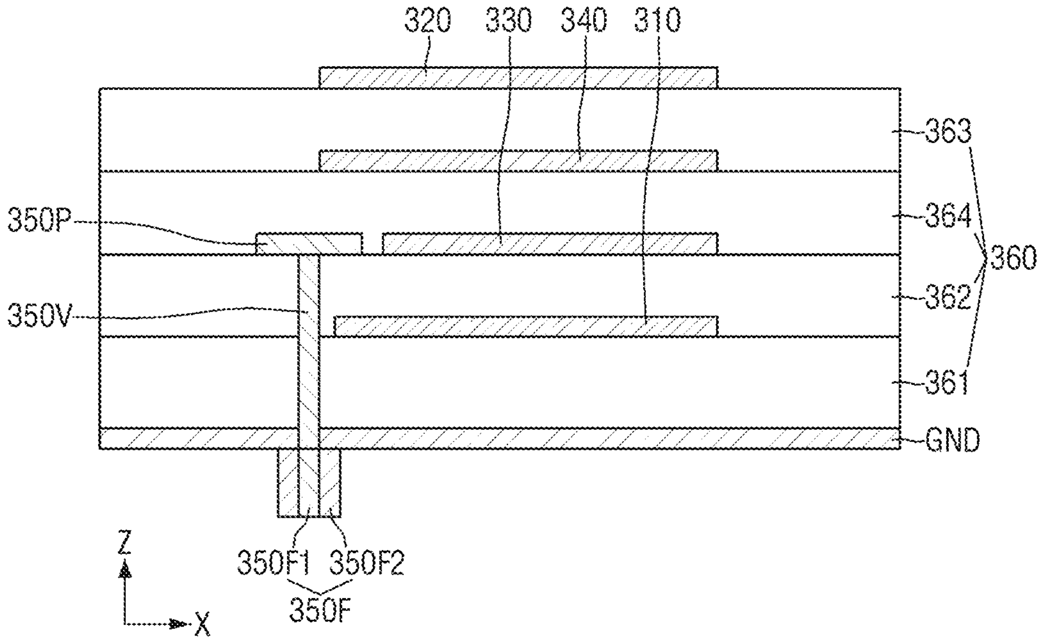

Referring to FIG. 8, the first antenna module 30A may further include the third antenna patch 330 disposed between the first antenna patch 310 and the second antenna patch 320, and a fourth antenna patch 340 on the third antenna patch 330. The fourth antenna patch 340 may be disposed between the second antenna patch 320 and the third antenna patch 330. The fourth antenna patch 340 may be disposed on a fourth dielectric layer 364 between the second dielectric layer 362 and the third dielectric layer 363. The first to fourth antenna patches 310, 320, 330, and 340 may be coupled and fed by the first feed structure 350.

Based on the first direction Z, distances between the horizontal feed line 350P and the first to fourth antenna patches 310, 320, 330, and 340 may not be limited to those illustrated in FIG. 8.

Figure 9:
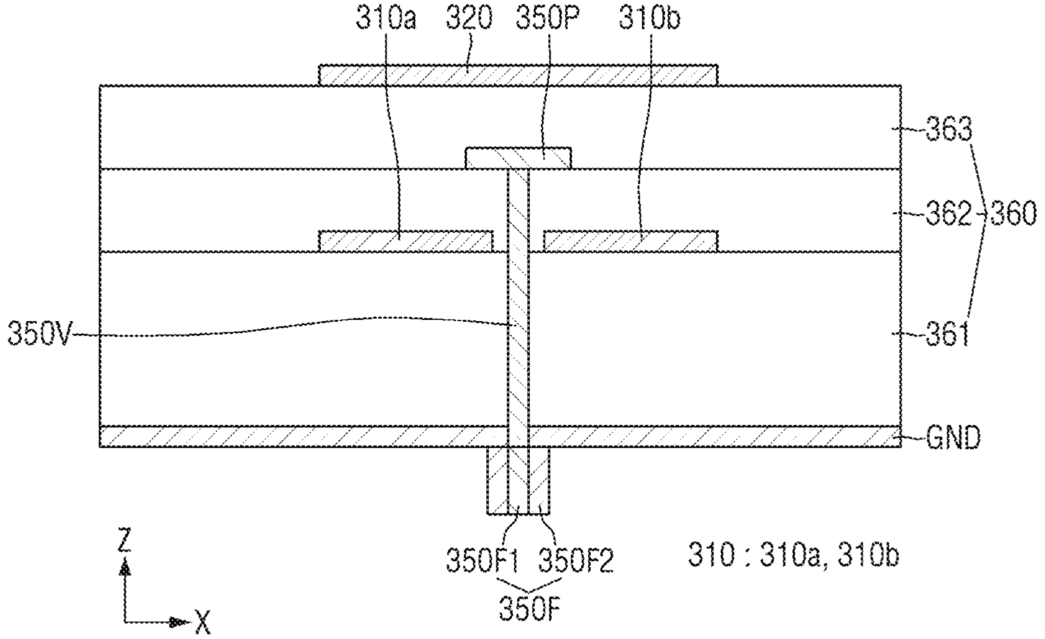

Referring to FIG. 9, the first antenna patch 310 may include a plurality of antenna patches spaced apart from each other in the second direction X. The first antenna patch 310 may include a first_a antenna patch 310*a* and a first_b antenna patch 310*b* spaced apart from each other in the second direction X with the horizontal feed line 350P interposed therebetween. The first_a, first_b, and second antenna patches 310*a*, 310*b*, and 320 may be coupled and fed by the first feed structure 350.

Although not specifically illustrated, the second antenna patch 320 may also include a plurality of antenna patches instead of the first antenna patch 310.

Although it is illustrated in FIG. 9 that the first antenna patch 310 includes only two antenna patches, the technical spirit of the present disclosure is not limited thereto. That is, the first antenna patch 310 may include two or more antenna patches. In this case, the spacing between the first antenna patches 310, the width of the first antenna patches 310, and the spacing between the horizontal feed line 350P and the first antenna patches 310 are also not limited to those illustrated in FIG. 9, and may be variously formed.

Figure 10:
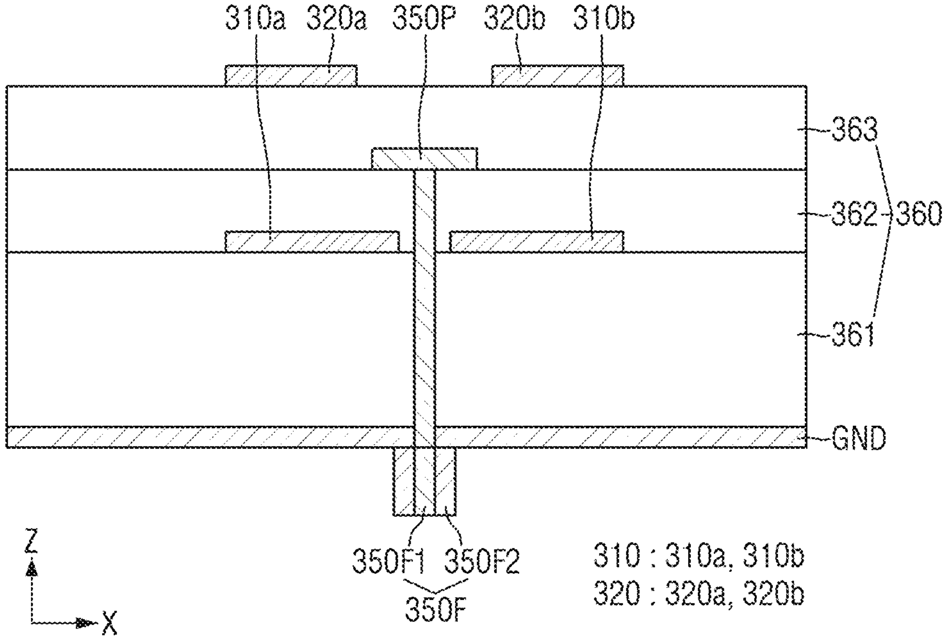

Referring to FIG. 10, each of the first and second antenna patches 310 and 320 may include a plurality of antenna patches spaced apart from each other in the second direction X. The second antenna patch 320 may include a second_a antenna patch 320*a* and a second_b antenna patch 320*b* spaced apart from each other in the second direction X with the horizontal feed line 350P interposed therebetween. The first_a and first_b, and second_a and second_b antenna patches 310*a*, 310*b*, 320*a*, and 320*b* may be coupled and fed by the first feed structure 350.

Although it is illustrated in FIG. 10 that each of the first and second antenna patches 310 and 320 includes only two antenna patches, the technical spirit of the present disclosure is not limited thereto. That is, each of the first and second antenna patches 310 and 320 may include two or more antenna patches. In this case, the spacing between the first and second antenna patches 310 and 320, the width of each of the first and second antenna patches 310 and 320, and the spacing between the horizontal feed line 350P and the first and second antenna patches 310 and 320 are also not limited to those illustrated in FIG. 10, and may be variously formed.

Figure 11:
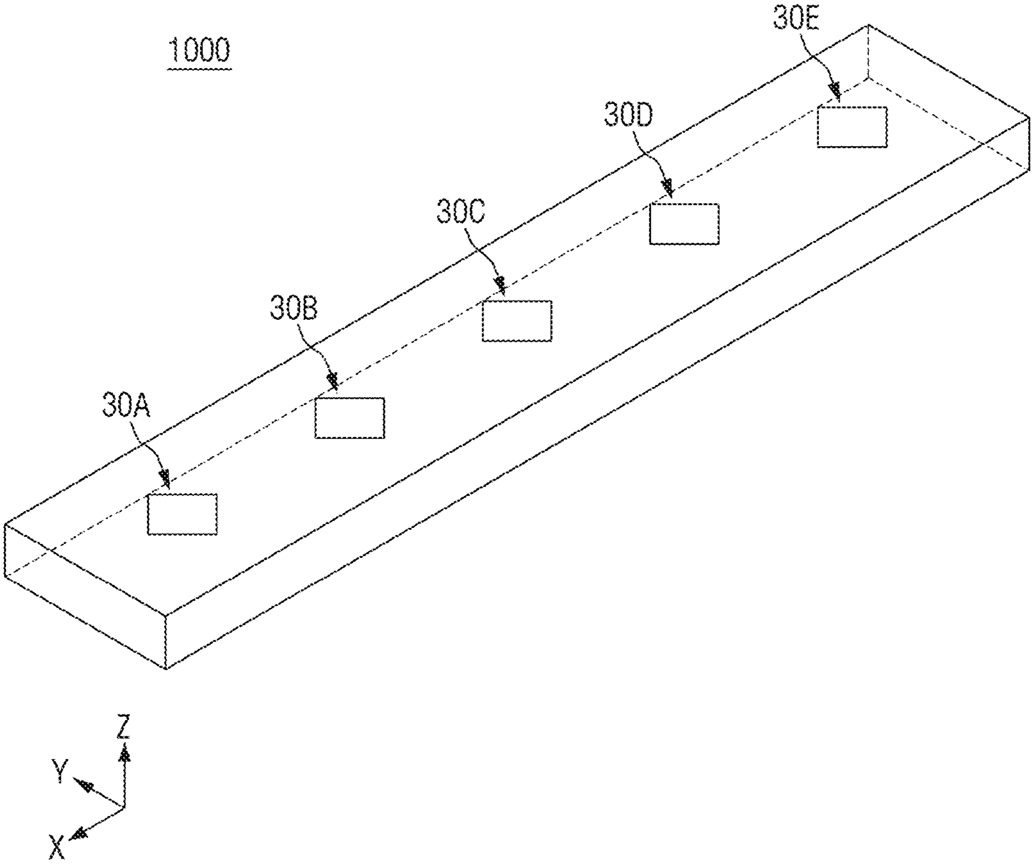
FIG. 11 is a view for describing an antenna array according to some exemplary embodiments.

FIG. 11 is a view for describing an antenna array according to some exemplary embodiments. For convenience of explanation, differences from the contents described above with reference to FIGS. 1 to 10 will be mainly described. The description of the first antenna module 30A described above may be similarly applied to each of the second to fifth antenna modules 30B, 30C, 30D, and 30E illustrated in FIG. 11.

Referring to FIG. 11, the first to fifth antenna modules 30A, 30B, 30C, 30D, and 30E may constitute an antenna array 1000. Although it is illustrated in FIG. 11 that the number of antenna modules included in one antenna array is five, the technical spirit of the present disclosure is not limited thereto. That is, the number of antenna modules included in one antenna array may be smaller or greater than five. In addition, the arrangement of the antenna modules included in one antenna array is also not limited to that illustrated in FIG. 11.

The second antenna module 30B may be disposed to be spaced apart from the first antenna module 30A in the first direction X. The second antenna module 30B may include a plurality of feed lines electrically connected to the RFIC chip 200*a* through a second feed structure.

The second antenna module 30B may include first and second antenna patches for transmitting and/or receiving signals of different frequency bands. The first and second antenna patches may be coupled and fed by the second feed structure.

The third antenna module 30C may be disposed to be spaced apart from the first and second antenna modules 30A and 30B in the first direction X. The third antenna module 30C may include a plurality of feed lines electrically connected to the RFIC chip 200*a* through a third feed structure.

The third antenna module 30C may include first and second antenna patches for transmitting and/or receiving signals of different frequency bands. The first and second antenna patches may be coupled and fed by the third feed structure.

The fourth antenna module 30D may be disposed to be spaced apart from the first, second, and third antenna modules 30A, 30B, and 30C in the first direction X. The fourth antenna module 30D may include a plurality of feed lines electrically connected to the RFIC chip 200*a* through a fourth feed structure.

The fourth antenna module 30D may include first and second antenna patches for transmitting and/or receiving signals of different frequency bands. The first and second antenna patches may be coupled and fed by the fourth feed structure.

The fifth antenna module 30E may be disposed to be spaced apart from the first to fourth antenna modules 30A, 30B, 30C, and 30D in the first direction X. The fifth antenna module 30E may include a plurality of feed lines electrically connected to the RFIC chip 200*a* through a fifth feed structure.

The fifth antenna module 30E may include first and second antenna patches for transmitting and/or receiving signals of different frequency bands. The first and second antenna patches may be coupled and fed by the fifth feed structure.

Figure 12:
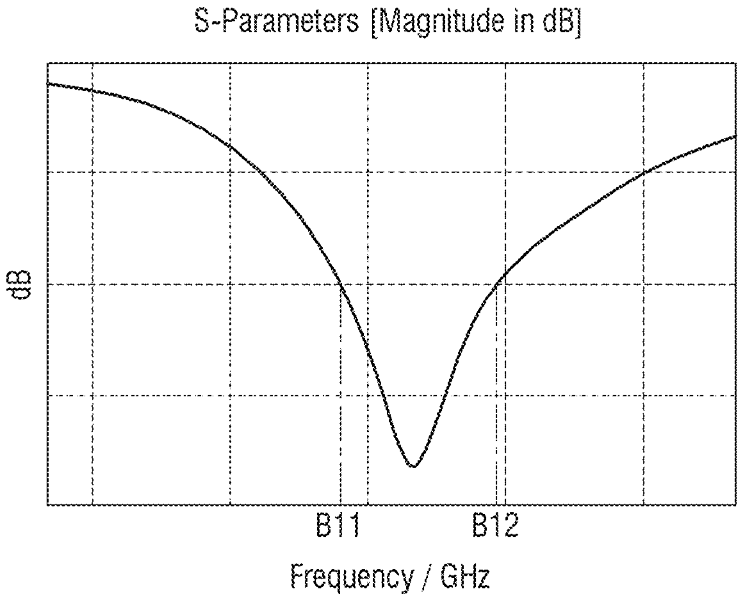
FIGS. 12 and 13 are views for describing an effect of an antenna module according to some exemplary embodiments.
Figure 13:
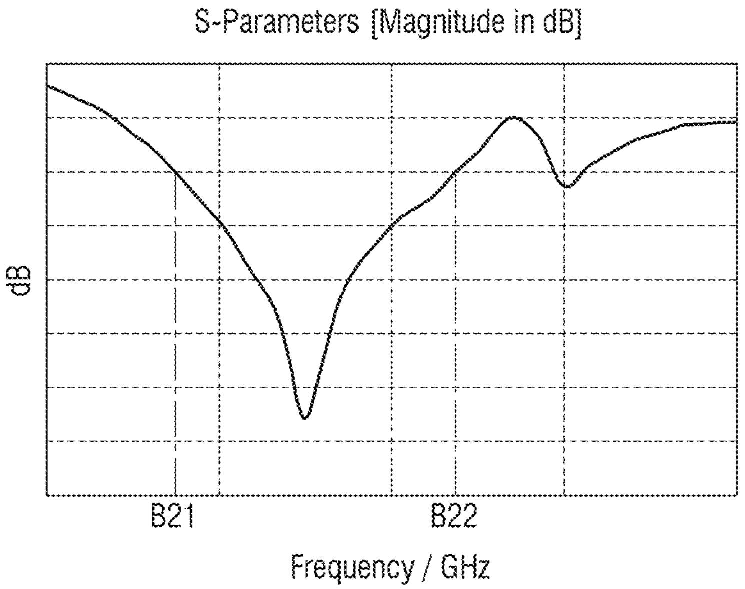

FIGS. 12 and 13 are views for describing an effect of an antenna module according to some exemplary embodiments. For reference, FIGS. 12 and 13 are graphs for describing a frequency band in which the antenna module 30A of FIG. 5 operates.

FIG. 12 is a view illustrating antenna characteristics in a case in which the feed structure 350 does not exist according to some exemplary embodiments. FIG. 13 is a view illustrating antenna characteristics in a case in which the feed structure 350 exists according to some exemplary embodiments.

In the case of FIG. 12, when the feed structure 350 does not exist, the antenna module may operate in a first band of a B11 frequency B11 and a B12 frequency B12. In the case of FIG. 13, the antenna module 30A may operate in a second band of a B21 frequency B21 and a B22 frequency B22.

Comparing FIGS. 12 and 13, it may be seen that the antenna characteristics are more improved when the feed structure 350 exists. That is, by using the coupling feed structure between the plurality of antenna patches, the antenna module 30A may transmit/receive the RF signals of a wider frequency band than in the related art. As a result, since a matching specific bandwidth of the antenna module increases compared to the related art, improved characteristics may be secured even without a distinct matching circuit.

Figure 14:
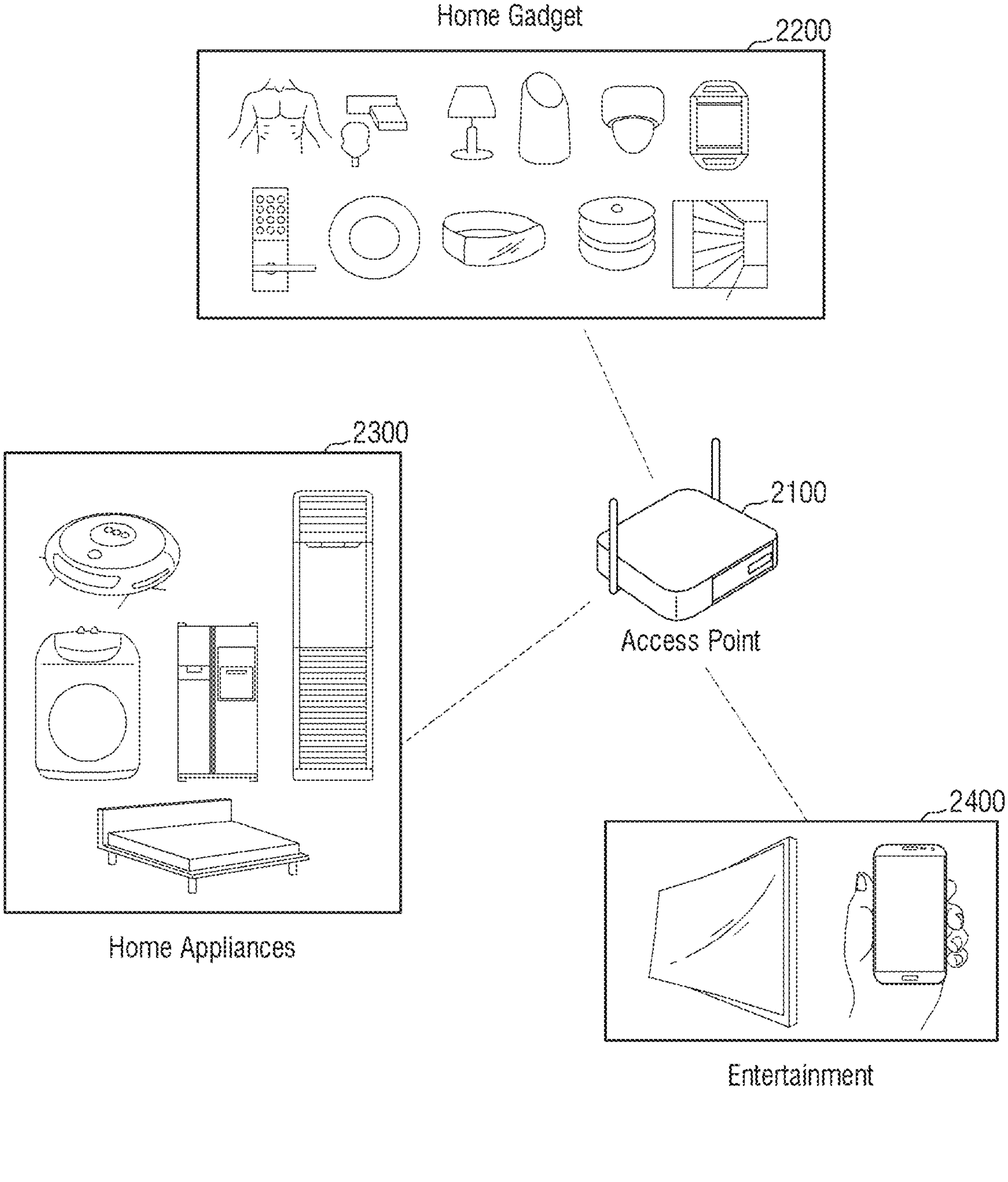
FIG. 14 is a diagram for describing a communication equipment including an antenna module according to some exemplary embodiments.

FIG. 14 is a diagram for describing a communication equipment including an antenna module according to some exemplary embodiments.

Specifically, FIG. 14 illustrates an example in which various wireless communication equipments communicate with each other in a wireless communication system using WLAN.

A home gadget 2200, home appliances 2300, entertainment equipment 2400, and/or an access point (AP) 2100 may constitute an Internet of Things (IoT) network system. Each of the home gadget 2200, the home appliances 2300, the entertainment equipment 2400, and the AP 2100 may include a transceiver according to some exemplary embodiments as a component. The home gadget 2200, the home appliances 2300, and the entertainment equipment 2400 may wirelessly communicate with the AP 2100, and the home gadget 2200, the home appliances 2300, and the entertainment equipment 2400 may also wirelessly communicate with each other. According to some exemplary embodiments, the antenna module 30A (and/or the RFIC chip 200*a*) may be included in one or more of the home gadget 2200, the home appliances 2300, the entertainment equipment 2400, and/or the AP 2100.

Conventional wireless communication devices are unable to sufficiently compensate for attenuation of millimeter wave transmission signals. For example, the limited physical dimensions and power storage of wireless communication devices limits opportunities for increasing transmission power by increasing the output power of the power amplifier or the gain of the antenna of the conventional wireless communication devices.

According to some exemplary embodiments, however, improved devices are provided for wireless communication. For example, the improved devices may include an antenna module in close proximity to an RFIC (e.g., the antenna module may be on the RFIC), with a feed structure connected to the RFIC and positioned between antenna patches of the antenna module. Such improved devices reduce signal attenuation by the feed structure, enabling the improved devices to transmit and/or receive RF signals of a wider frequency band while conserving physical space. Accordingly, the improved devices overcome the deficiencies of the conventional devices to at least increase the transmission power of millimeter wave transmission signals.

According to some exemplary embodiments, operations described herein as being performed by the communication equipment 10, the RFIC 200, the signal processor 300, the communication equipment 10*a*, the electronic device 20*a*, the digital integrated circuit 13*a*, the RFIC 200*a*, the home gadget 2200, the home appliances 2300, the entertainment equipment 2400 and/or the AP 2100 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some exemplary embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

It will be understood that when an element is referred to as being "connected" or "coupled" to another element, it may be directly connected or coupled to the other element or intervening elements may be present. As used herein the term "and/or" includes any and all combinations of one or more of the associated listed items.

Some exemplary embodiments are described herein with reference to cross-sectional illustrations that are schematic illustrations of idealized examples. As such, variations from the shapes of the illustrations as a result, for example, of manufacturing techniques and/or tolerances, are to be expected. Thus, some exemplary embodiments should not be construed as limited to the particular shapes of regions illustrated herein but are to include deviations in shapes that result, for example, from manufacturing.

Some exemplary embodiments of the present disclosure have been described above with reference to the accompanying drawings, but the present disclosure may be implemented in various different forms, and those skilled in the art to which the present disclosure pertains may understand that the present disclosure may be implemented in other specific forms without changing the technical spirit or essential features of the present disclosure. Therefore, it should be understood that some exemplary embodiments described above are illustrative in all aspects and not restrictive.

What is claimed is:

1. An antenna module comprising:

a first antenna patch for radiating electromagnetic energy of a first frequency band;

a second antenna patch for radiating electromagnetic energy of a second frequency band, the second frequency band being different from the first frequency band, and both the first antenna patch and the second antenna patch spaced apart from a ground structure in a first direction; and a feed structure spaced apart from each of the first antenna patch and the second antenna patch, the feed structure being between the first antenna patch and the second antenna patch, the feed structure being connected to the ground structure, and the feed structure including, a horizontal feed line extending in a second direction intersecting the first direction, the horizontal feed line being configured to provide an RF signal to the first antenna patch and the second antenna patch, and a vertical feed line extending in the first direction.

2. The antenna module of claim 1, wherein the horizontal feed line is spaced apart from each of the first antenna patch and the second antenna patch in the first direction.

3. The antenna module of claim 1, wherein the horizontal feed line at least partially overlaps both the first antenna patch and the second antenna patch.

4. The antenna module of claim 1, wherein the first antenna patch includes a concave portion recessed into a side of the first antenna patch in the second direction; and the concave portion surrounds at least a portion of the vertical feed line.

5. The antenna module of claim 1, further comprising:

a third antenna patch between the first antenna patch and the second antenna patch, the horizontal feed line being on the same plane as the third antenna patch.

6. The antenna module of claim 5, further comprising:

a fourth antenna patch between the second antenna patch and the third antenna patch.

7. The antenna module of claim 1, further comprising:

a plurality of first antenna patches spaced apart from each other in the second direction, the plurality of first antenna patches including the first antenna patch.

8. The antenna module of claim 1, further comprising:

a plurality of second antenna patches spaced apart from each other in the second direction, the plurality of second antenna patches including the second antenna patch.

9. The antenna module of claim 1, wherein the RF signal includes a first RF signal and a second RF signal;

the first antenna patch is configured to radiate the electromagnetic energy of the first frequency band based on the first RF signal; and the second antenna patch is configured to radiate the electromagnetic energy of the second frequency band based on the second RF signal.

10. An electronic device comprising:

a radio frequency integrated circuit (RFIC) chip; and a first antenna module on the RFIC chip, the first antenna module including, a first dielectric substrate, a second dielectric substrate, a third dielectric substrate, the first dielectric substrate, the second dielectric substrate and the third dielectric substrate being sequentially stacked on a ground structure in a first direction, a first antenna patch on the first dielectric substrate, a second antenna patch on the third dielectric substrate, the first antenna patch and the second antenna patch not being connected to the ground structure, and a first feed structure spaced apart from each of the first antenna patch and the second antenna patch in the first direction, the first feed structure electrically connecting the RFIC chip and the first antenna module, and the first feed structure including, a conductive pad extending in a second direction, the second direction intersecting the first direction, the conductive pad being configured to provide an RF signal to the first antenna patch and the second antenna patch, a conductive via penetrating through the first dielectric substrate, and a feed portion connected to the ground structure.

11. The electronic device of claim 10, wherein the conductive pad and the conductive via are not in contact with either of the first antenna patch or the second antenna patch.

12. The electronic device of claim 10, wherein the conductive pad is on the second dielectric substrate between the first antenna patch and the second antenna patch.

13. The electronic device of claim 10, wherein a first separation distance between the conductive pad and the first antenna patch is equal to a second separation distance between the conductive pad and the second antenna patch.

14. The electronic device of claim 10, wherein the conductive pad has a disk shape.

15. The electronic device of claim 10, wherein the first antenna module further includes a third antenna patch between the first antenna patch and the second antenna patch.

16. The electronic device of claim 10, further comprising:

an array of antenna modules, the array of antenna modules including the first antenna module, a second antenna module and a third antenna module, wherein the second antenna module is spaced apart from the first antenna module in the second direction, the second antenna module being electrically connected to the RFIC chip through a second feed structure, and the third antenna module is spaced apart from each of the first antenna module and the second antenna module in the second direction, the third antenna module being electrically connected to the RFIC chip through a third feed structure.

17. An electronic device comprising:

a radio frequency integrated circuit (RFIC) chip;

a first antenna module electrically connected to the RFIC chip through a first feed structure;

a second antenna module spaced apart from the first antenna module in a first direction, the second antenna module being electrically connected to the RFIC chip through a second feed structure; and a third antenna module spaced apart from each of the first antenna module and the second antenna module in the first direction, the third antenna module being electrically connected to the RFIC chip through a third feed structure, wherein the first antenna module includes, a first antenna patch for radiating electromagnetic energy of a first frequency band, a second antenna patch for radiating electromagnetic energy of a second frequency band, the second frequency band being different from the first frequency band, both the first antenna patch and the second antenna patch being spaced apart from a ground structure in a second direction, and the second direction being perpendicular to the first direction, and a feed structure spaced apart from each of the first antenna patch and the second antenna patch, the feed structure being between the first antenna patch and the second antenna patch, the feed structure being connected to the ground structure, and the first feed structure including, a horizontal feed line configured to provide an RF signal to the first antenna patch and the second antenna patch, and a vertical feed line.

18. The electronic device of claim 17, wherein the horizontal feed line and the vertical feed line are not in contact with either of the first antenna patch and the second antenna patch.

19. The electronic device of claim 17, wherein the horizontal feed line at least partially overlaps both the first antenna patch and the second antenna patch.

20. The electronic device of claim 17, wherein the RF signal includes a first RF signal and a second RF signal;

the first antenna patch is configured to radiate the electromagnetic energy of the first frequency band based on the first RF signal; and the second antenna patch is configured to radiate the electromagnetic energy of the second frequency band based on the second RF signal.

* * * * *